April 1, 1969 J. A. KONKEL ET AL 3,436,470

HUE ADJUST CIRCUIT FOR A COLOR TELEVISION RECEIVER

Filed April 20, 1966

INVENTORS
JOHN A. KONKEL AND
FREDERICK A. JOY
BY Eugene M. Whitacre
Attorney 3,436,470

HUE ADJUST CIRCUIT FOR A COLOR TELEVISION RECEIVER

John A. Konkel, Indianapolis, Ind., and Frederick A. Joy, Evanston, Ill., assignors to Radio Corporation of America, a corporation of Delaware Filed Apr. 20, 1966, Ser. No. 543,879
Int. Cl. H04n *5/44*; H03d *3/18*; H03b *3/00*
U.S. Cl. 178—5.4 4 Claims

ABSTRACT OF THE DISCLOSURE

A hue adjust circuit for a color television receiver includes a capacitive element, a variable resistive element, and an inductive element connected in series across a circuit tuned to the color reference wave, with the movable tap or slider on the variable resistive element coupled to a point of reference potential. A pair of capacitive elements are additionally included to couple that point to the end terminals of the resistive element. By adjusting the position of the slider, the effective capacitance in the tuned circuit can be changed, and the reference wave can be shifted over a suitable angle to vary the hue of the reproduced color image.

This invention relates to color television receivers and, more particularly, to a circuit arrangement for manually adjusting the hue of a televised image reproduced therein in full color.

In the standardized color television system, four types of signal information are transmitted from the signal source. One type of information is the line and field deflection scanning synchronization information. A second type of information represents the brightness or luminance signal which conveys the black and white or monochrome image information. A third type of information is a chrominance signal comprising a color sub-carrier of 3.58 megacycles mean frequency, which is amplitude-modulated in accordance with the degree of saturation of the color being transmitted and which is phase-modulated in accordance with its hue. The fourth type of information is in the form of at least eight cycles of color synchronizing bursts transmitted during the blanking interval for each of the scanning lines and is used to provide reference phase information.

In many present day color television receiver systems, the chrominance signal is separated from the composite color television signal, amplified, and coupled to the color demodulator circuits. The color synchronizing bursts are also separated from the composite signal, amplified, and used to synchronize a reference carrier oscillator in the receiver, which oscillator develops a reference wave having a fixed phase with respect to the cycles of the color burst. This reference was is then suitably coupled to the color demodulator circuits to synchronously demodulate the chrominance signal for the recovery of the color representative intelligence signals. The result of the synchronous demodulation of the color carrier are so called "color difference" signals which, when combined with the brightness or luminance signal, produce respective signals representative of the primary colors in which the image reproduction is to be effected. The brightness and color difference signals are then impressed upon the tri-color kinescope image reproducing apparatus.

The phase of the reference wave generated in the color television receiver is determined by the color burst information so that the hue of the reproduced image will be the same as that of the scene televised. There are times, however, when it is desirable to be able to adjust the hue of the image as reproduced to overcome phase distortion of the chrominance signals that may occur in transmission, for example, or merely to comply with the dictates of personal taste.

Hue adjustment may be provided, according to prior art teachings, by connecting a variable capacitor acress one or more circuits in which the reference wave is generated and shifting the phase of the generated wave over a small angular range. A variable capacitor for such tuning is relatively expensive and usually must be so located with respect to the operating panel of the television receiver that expensive mechanical coupling must be employed to make the adjustment convenient to the viewer.

It is an object of the present invention, therefore, to provide an improved circuit arrangement for conveniently adjusting the hue of the image reproduced by a color television receiver.

It is another object of the invention to provide an inexpensive hue adjust circuit arrangement for easy operation by the viewer.

As will become clear hereinafter, a circuit arrangement embodying the invention includes a capacitive element, a variable resistive element, and an inductive element connected in series across a circuit tuned to the color reference wave, with the movable tap or slider on the variable resistive element coupled to a point of reference or ground potential. For ease of control, the variable resistive element may be located at any convenient point on the television receiver chassis, such as near the front panel, by using shielded cable to connect the resistive, the inductive and the capacitive elements in series; the shunt capacitance of the cable supplying a first capacitance in series with the capacitive element and a second capacitance in series with the inductive element. By adjusting the position of the slider, the phase of the reference wave can be shifted over a suitable angle to vary the hue of the reproduced color image.

For a better understanding of the present invention, together with further objects thereof, reference is had to the following description, taken in connection with the drawings, and its scope will be pointed out in the appended claims.

In the drawings:

FIGS. 1(*a*) and 1(*b*) are schematic diagrams of phase shift circuits useful in explaining the principles of the present invention;

Figures 1, 2, 3, 4:
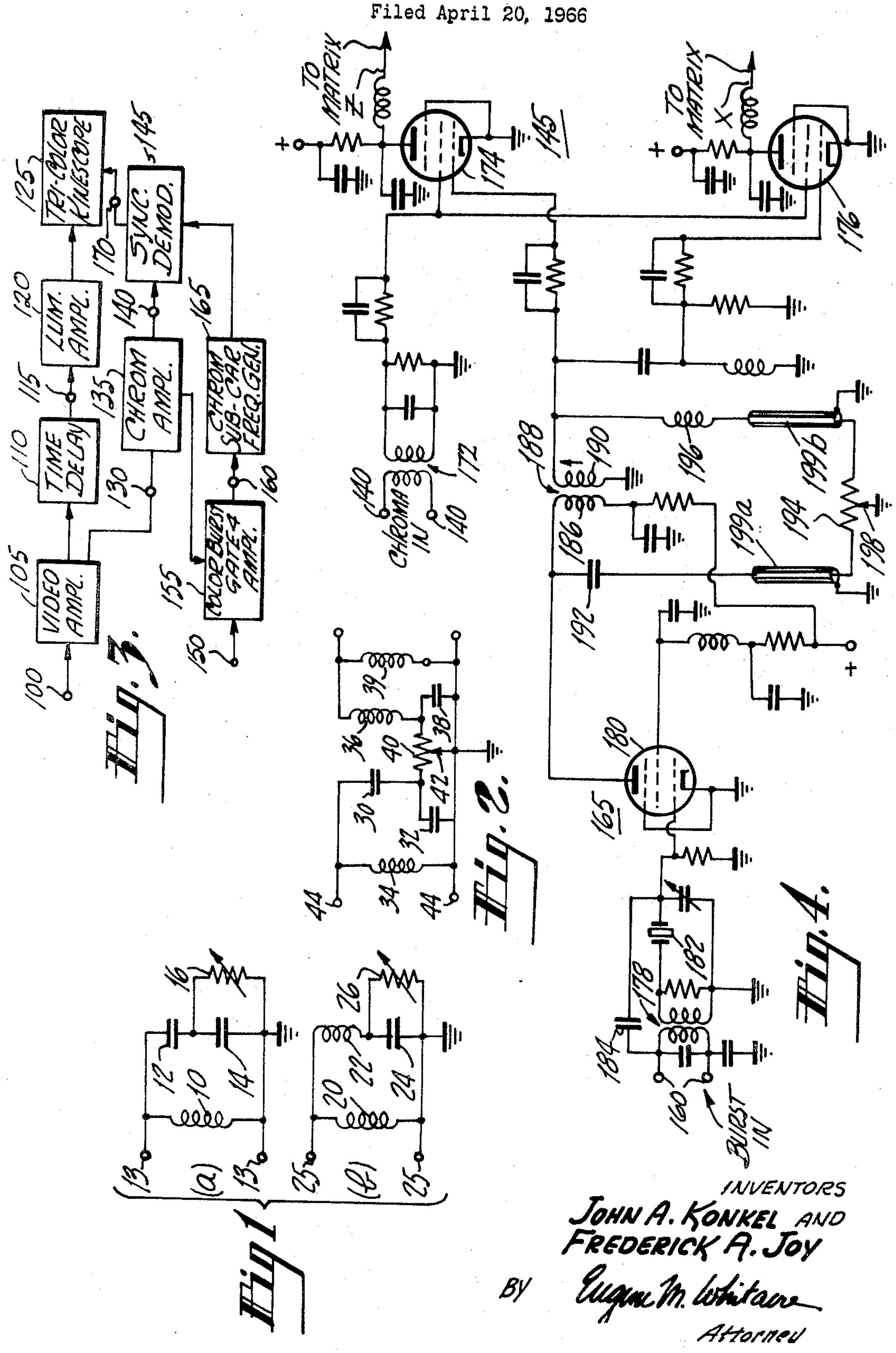
FIG. 2 is an equivalent diagram of a hue adjusting circuit for a color television receiver according to the invention.
FIG. 3 is a block diagram of portions of a color television receiver which may incorporate the invention.
FIG. 4 is a schematic circuit diagram of an embodiment of the invention for shifting the phase of a color reference wave for application to a color demodulator circuit.

Referring now more particularly to FIG. 1(*a*), there is shown a circuit helpful in understanding the invention. As illustrated, an inductor 10 is shunted by a capacitive reactance network shown as comprising two capacitors 12 and 14 connected in series. This parallel circuit may be tuned to a given frequency by varying the inductance of the inductor 10 or the capacitance of one or both of the series connected capacitors 12 or 14 or both. A shift in phase of the energy applied to this resonant circuit by way of the terminals 13 may be effected by slightly detuning the resonant circuit from the frequency of the applied energy. According to a first aspect of the invention, detuning to effect a phase shift is accomplished by means of a variable resistor 16 shunted across one of the series capacitors 14. When the resistor 16 is adjusted for zero resistance only the capacitance of the other series capacitor 12 is effective in determining the resonant frequency whereas when the resistor 16 is adjusted for maximum resistance the series combination of both capacitors 12 and 14 is effective. The phase shift is a function of the resistance value since all other component values are fixed. The values of the variable resistor 16 and the capacitors 12 and 14 are chosen to provide the desired phase shift.

Referring to FIG. 1(*b*), there is shown another circuit useful in explanation of the invention. As illustrated, an inductor 20 is shunted by an inductive-capacitive reactance network shown as comprising the inductor 22 and the capacitor 24 connected in series. This parallel circuit may be tuned to a given frequency by varying the inductance of the inductors 20 and/or 22 or the capacitance of the capacitor 24 or both. A shift in phase of the energy applied to this resonant circuit by way of the terminals 25 may be effected by slightly detuning the resonant circuit from the frequency of the applied energy. According to a second aspect of the invention, detuning to effect a phase shift is accomplished by means of a variable resistor 26 shunted across the capacitor 24. When the resistor 26 is adjusted for low values, the effective capacitance in the circuit for determining the resonant frequency is less than the value of capacitor 24. When the resistor 26 is adjusted for high values, the effective capacitance in the circuit is essentially that of capacitor 24. The phase shift is a function of the resistance value since all other component values are preestablished. The values of the variable resistor 26, inductor 22 and capacitor 24 are chosen to provide the desired phase shift.

The circuit of FIG. 2 shows how the phase shifting effects described above with reference to FIGS. 1(*a*) and 1(*b*) may be combined. In this circuit a pair of capacitors 30 and 32 are connected in series across an inductor 34. In addition an inductor 36 and a capacitor 38 are connected across an inductor 39 which is mutually coupled to the inductor 34. A resistor 40 is connected from the junction of capacitors 30 and 32 to the junction of the inductor 36 and capacitor 38. A tap or slide on the resistor 40 is connected to a point of reference potential such as ground.

Assume that a condition of reference phase exists when the slider 42 is at the center of the resistor 40. When the slider 42 is adjusted or moved to the left of center, the effective capacitance in series with the capacitor 30 will decrease thereby increasing the total effective capacitance across the inductor 34. Thus the circuit including the inductor 34 and capacitors 30 and 32 resonates at a lower frequency. Similarly the increased effective capacitance in series with the inductor 36 causes that circuit to resonate at a lower frequency.

When the slider 42 is moved to the right of the midportion of the resistor 40, the effective capacitance in series with the inductor 36 will decrease causing this circuit to resonate at a higher frequency. At the same time, the capacitance in series with the capacitor 30 will increase causing the circuit comprising the inductor 34 and the capacitors 30 and 32 to resonate at a higher frequency.

By changing the resonance of the circuit parts as indicated, the phase of a wave introduced at the terminals 44 may be adjusted in either direction from the condition of reference phase over a relatively wide range without introducing excessive amplitude variation or loading of the signal source coupled to the terminals 44.

The resistor 40 may be located at a considerable distance from the capacitor 30 and inductor 36. According to one form of the present invention, shielded cable is used to connect this resistance 40 to the remainder of the circuit of FIG. 2 and, also to prevent the pickup of stray energy from adjacent circuits. The shielded cable can additionally be used, if desired, to compose part or all of the capacitance afforded by capacitors 32 and 38.

Referring now to FIG. 3, there is shown a block diagram of portions of a color television receiver to which the invention is particularly applicable, and which receiver may otherwise comprise entirely conventional circuitry.

The demodulated composite video signal is applied to composite video signal input terminals 100 of a video frequency amplifying circuit 105. The luminance component of the composite video signal is applied by way of delaying circuit 110 to the input terminals 115 of a luminance signal amplifying circuit 120 for presentation to the input circuit of a tri-color kinescope image reproducing device 125. The composite video signal is also applied at input terminals 130 of a bandpass chrominance signal amplifying circuit 135 and the chrominance signal appearing at chrominance signal terminals 140 is applied to a synchronous demodulating circuit 145. A gating signal obtained by means of circuitry (not shown) and operating at the horizontal repetition rate is applied at gating signal input terminals 150 of a color burst gating and amplifying circuit 155 to which signals from the chrominance signal amplifying circuit 135 are also applied. The gated color burst appearing at color burst terminals 160 is applied to a chrominance sub-carrier frequency color reference wave generating circuit 165 from which color reference waves required for demodulating the chrominance signal are obtained and applied to the synchronous demodulating circuit 145. Color difference signals derived in the demodulating circuit 145 and appearing at output terminals 170 are applied to the tri-color kinescope 125 for mixing with the luminance signal to reproduce the televised image in color. The hue of the reproduced image can be adjusted by causing the phase of the color reference waves to be changed.

An example of an application of the hue adjusting circuit of the present invention to such a color television receiver is shown in FIG. 4. Bandpass chrominance signals obtained from amplifying circuit 135 are applied to chrominance signal terminals 140 and translated by means of a transformer 172 to the screen grid-cathode circuits of a pair of demodulating electron discharge devices, shown in the form of pentode tubes 174, 176, included in the synchronous demodulating circuit 145. Color reference waves obtained from generating circuit 165 are applied to the control grid-cathode circuits of the demodulating tubes 174, 176 of respective phase to demodulate the chrominance signals on the Z and X axes respectively. The demodulated signals are then applied to a plurality of electron discharge matrix tubes (not shown) arranged to produce three color difference signals—$(R-Y)$, $(G-Y)$, and $(B-Y)$—which together with the luminance signal obtained from amplifying circuit 120 are applied to the tri-color kinescope 125.

Color reference waves of proper phase for application to the control grid-cathode circuits of the demodulating tubes 174, 176 are obtained from the color reference wave generating circuit 165. Gated color bursts obtained from the color burst gating and amplifying circuit 155 are applied to color burst terminals 160 and translated by means of a coupling transformer 178 to the control grid-cathode circuit of an electron discharge color reference oscillator tube 180. A piezo-electric crystal device 182 is interposed in the control grid circuit of the oscillating tube 180 to provide injection locked oscillator action. A neutralizing capacitor 184 is connected between the control grid of the oscillating tube 180 and one terminal of the burst coupling transformer 178 in order to cancel the feedthrough of the crystal capacity to the control grid of the tube 180. A color reference wave locked in phase with the color bursts, is developed across the primary winding 186 of a color reference wave output transformer 188 for application to the chrominance signal demodulating circuit 145. The transformer 188 also comprises a secondary winding 190 in which currents of the reference wave frequency are induced by mutual coupling to the primary winding 186. This winding 190 is, as shown, coupled by suitable phase shifting networks to the control grids of the X and Z demodulator tubes 176 and 174 respectively so that the phase difference between the reference waves at these control grids is equal to the phase difference between the X and Z demodulation axes. The means phase difference betwen the reference waves at the control grids of the tubes 174 and 176 and the color burst applied to terminals 160 may be preset by adjustment of a core associated with the winding 190.

According to the present invention, viewer control of the phase shifting of the color reference waves and hence the hue of the reproduced image may be provided through the use of a capacitance, a variable resistance or potentiometer, and an inductance connected in series across a circuit tuned to the color reference wave, with the movable tap or slider on the potentiometer coupled to a point of reference or ground potential, and with first and second capacitive elements respectively connecting the capacitance and inductance to that point of potential.

In order to prevent detuning the oscillator 165 of the color television receiver, the phase relationship is altered at the color reference wave signal output transformer 188. A capacitor 192, a potentiometer 194 and an inductor 196 are connected in series between the high potential sides of the primary and secondary windings 186 and 190, respectively, with the slider 198 of potentiometer 194 coupled to ground. First and second lengths of shielded cable 199a and 199b connect the capacitor 192 and the inductor 196 to opposite terminals of the potentiometer 194, which is preferably located at some convenient point on the operating panel of the television receiver. The capacitance of the cable 199a and the capacitance of the capacitor 192 constitute the capacitance of the corresponding capacitors 32 and 30 in FIG. 2. In the circuit arrangement of FIG. 4 the primary circuit of the color reference wave signal output transformer 188 is tuned to resonance by means of the capacitor 192 with the capacitance of the cable 199a in series therewith, while the secondary circuit of the transformer 188 is tuned to resonance by means of the effective capacitance thereacross including that of the network 196–199b as well as that presented by the circuit coupling the winding 190 to the demodulator tubes 174 and 176. As much as two or three feet of shielded cable can be readily used. With the arrangement shown in FIG. 4 a phase change of plus or minus 60° is readily obtainable without excessive loading on the oscillator or variation in amplitude of the reference waves. This phase change provides a wide range of hue control for color television receivers.

The following circuit constants are presented as being illustrative of values that may be utilized in the arrangement of FIG. 4:

| Ref. No. | Component | Type or value |
|---|---|---|
| 174, 176 | Chrominance demodulator tubes | P/S 6GH8. |
| 180 | Color reference oscillator tube | P/S 6GH8. |
| 192 | Series capacitor | 22 mmf. |
| 194 | Hue control potentiometer | 2,500 ohms. |
| 196 | Series inductor | 5.6 μh. |
| 199a, 199b | Shielded cable distributed capacitance | 140 mmf. |

What is claimed is:

1. A phase shifting network having a source of waves of predetermined frequency comprising:
first and second inductors, one of which is coupled to said source of waves;
first and second capacitive means serially coupled across said first inductor to provide a first circuit loop resonant at substantially said predetermined frequency;
a third inductor and third capacitive means serially coupled across said second inductor to provide a second circuit loop resonant at substantially said predetermined frequency;
a resistive element having an adjustable tapping member moveable to change the resistance between one end of said resistive element and said tapping member;
means connecting said resistive element from the junction of said first and second capacitive means to the junction of said third inductor and third capacitive means;
means coupling in common one terminal of said first and second inductor and said tapping member; and
output circuit means coupled to the other of said first and second inductors.

2. A phase shifting network comprising in combination:
first and second mutually coupled inductors;
means providing a source of reference waves of predetermined frequency coupled across said first inductor;
first and second capacitive means serially connected across said first inductor to provide a first circuit loop resonant at substantially said predetermined frequency;
a third inductor and third capacitive means serially connected across said second inductor to provide a second circuit loop resonant substantially at said predetermined frequency;
a resistive element having an adjustable tapping member moveable to change the resistance between one end of said resistive element and said tapping member;
means connecting said resistive element from the junction of said first and second capacitive means to the junction of said third inductor and third capacitive means;
means connecting said tapping member in common to the junction of said first inductor and said second capacitive means and to the junction of said second inductor and said third capacitive means whereby adjustment of said tapping member changes the phase of reference waves developed across said second inductor; and
output circuit means coupled to said second inductor.

3. A hue control for a color television receiver including a color reference oscillator of the injection lock type having an active device with input, output and common electrodes, and further having an input circuit to which a received color burst wave is applied, said input circuit being sharply tuned to accept substantially only waves of the frequency of said color burst comprising:
a first resonant circuit comprising first and second capacitive means connected in series between said output and common electrodes and a first inductor connected in parallel with said first and second capacitive means;
a second resonant circuit comprising a second inductor coupled to said first inductor and a third inductor and a third capacitive means connected in series across said second inductor;
a resistive element having an adjustable tapping member moveable to change the resistance between one end of said resistive element and said tapping member;
means connecting said resistive element from the junction of said first and second capacitive means to the junction of said third inductor and third capacitive means;
means connecting said tapping member in common to the junction of said first inductor and said second capacitive means and to the junction of said second inductor and said third capacitive means whereby adjustment of said tapping member changes the phase of reference waves developed across said second inductor; and
output circuit means coupled to said second inductor.

4. A hue control as defined in claim 3 wherein said resistive element is remotely located relative to said first and second inductors, and wherein shielded cable means comprise said resistive element connecting means, the capacitance of said shield cable means comprising at least a portion of said second and third capacitive means.

References Cited

UNITED STATES PATENTS 2,881,245 4/1959 Fenton et al. -------- 178—5.4

3,007,999 11/1961 Kelly --------------- 178—5.4
3,274,334 9/1966 Hansen et al. -------- 178—5.4

ROBERT L. GRIFFIN, *Primary Examiner.*

JOHN MARTIN, *Assistant Examiner.*

U.S. Cl. X.R.

329—50; 331—74; 333—29